United States Patent [19]

Herscher

[11] Patent Number: 4,567,949
[45] Date of Patent: Feb. 4, 1986

[54] SOIL TILLING MACHINE WITH TRANSMISSION HAVING THREE DRIVE TRAINS

[75] Inventor: Lee R. Herscher, Kankakee, Ill.

[73] Assignee: Roper Corporation, Kankakee, Ill.

[21] Appl. No.: 466,064

[22] Filed: Feb. 14, 1983

[51] Int. Cl.$^4$ .................. A01B 33/02; B62D 51/06
[52] U.S. Cl. .................................. 172/42; 172/125; 180/19.1
[58] Field of Search .................. 172/42, 43, 125; 180/19 R, 19 S, 19 H, 19.1, 19.2, 19.3

[56] References Cited

U.S. PATENT DOCUMENTS

| | | | |
|---|---|---|---|
| 2,049,661 | 8/1936 | Pedersen | 74/355 |
| 2,770,894 | 11/1956 | Gettleman | 180/19.1 X |
| 2,989,127 | 6/1961 | Oertle, Jr. | 172/43 X |
| 3,442,335 | 5/1969 | Silbereis et al. | 172/43 |
| 4,244,427 | 1/1981 | Enters et al. | 172/42 |
| 4,396,067 | 8/1983 | Enters et al. | 172/42 |
| 4,402,366 | 9/1983 | Dankel | 172/43 |

FOREIGN PATENT DOCUMENTS 438698  6/1925  Fed. Rep. of Germany ...... 172/125

Primary Examiner—Richard T. Stouffer
Attorney, Agent, or Firm—Leydig, Voit & Mayer, Ltd.

[57] ABSTRACT

A walk-behind garden tiller having a pair of ground wheels and a row of soil penetrating and pulverizing tines both powered from a single engine through a power transmission. The transmission includes a tilling drive mode in which the tines and drive wheels are simultaneously driven, a non-tilling reverse ground wheel drive mode, a non-tilling machine transport drive mode, and a neutral drive mode, all controlled by a single, simple push-pull lever which is adapted to automatically disengage power transmission to the tines when the tiller is operated in either the reverse, transport, or neutral drive modes.

17 Claims, 6 Drawing Figures

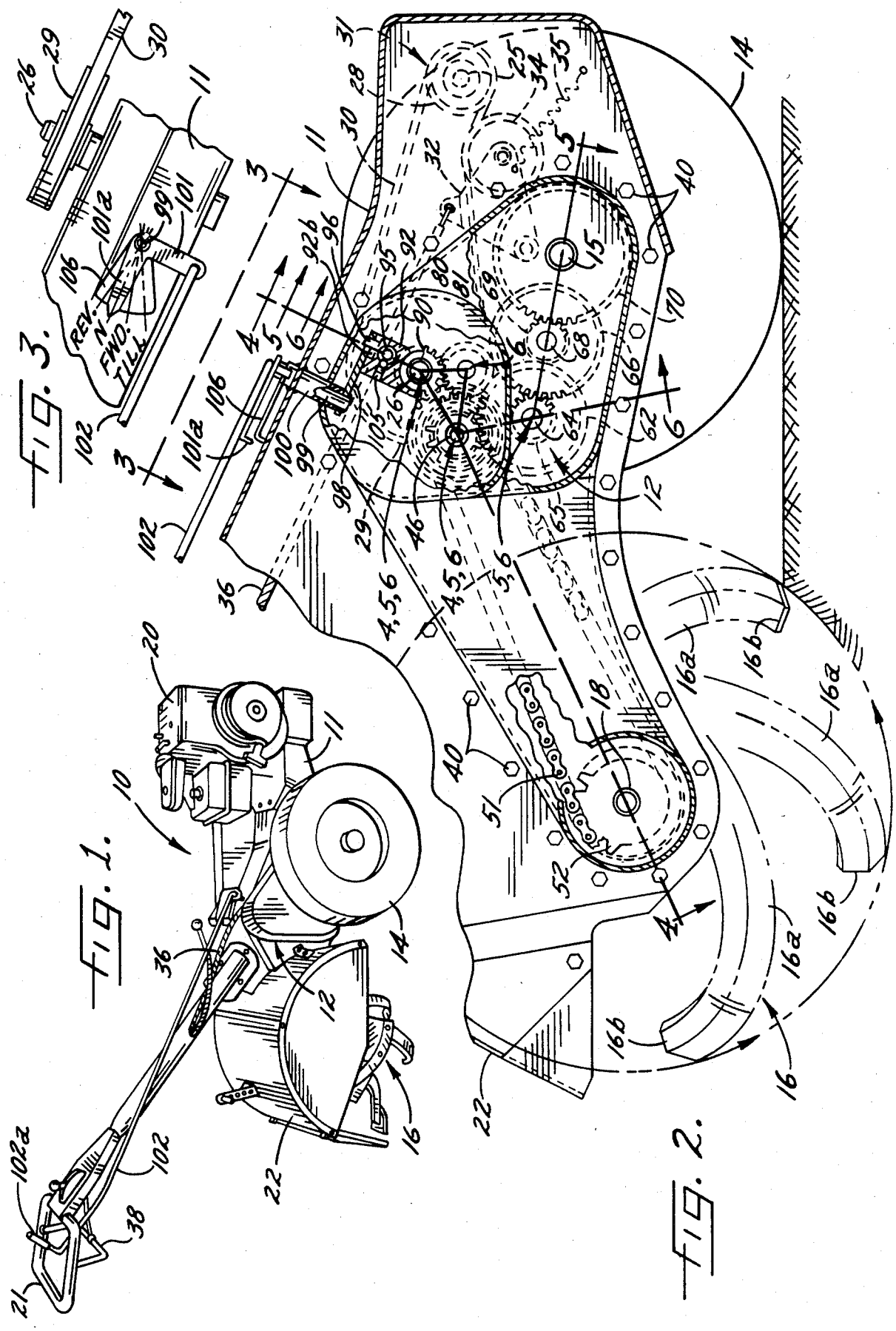

TINE DRIVE - TILL

REVERSE DRIVE

SOIL TILLING MACHINE WITH TRANSMISSION HAVING THREE DRIVE TRAINS

DESCRIPTION OF THE INVENTION

The invention relates to power operated soil tilling machines, and more particularly, to soil tilling machines of the type that are manually manipulated and controlled by a person walking with or behind the machine.

Manually operated soil tilling machines of the type which are intended for garden usage commonly comprise a frame having driven ground wheels and a single row of power driven tines for penetrating and pulverizing the earth. While the ground wheels usually can be driven in either forward or reverse directions to facilitate movement of the machine during tilling or during transport of the machine to and from the tilling site, movement of such walk-behind tillers generally is cumbersome to control any time the tines are driven. The tine shaft of such manually operated tilling machines typically is driven in the same rotary direction as the forward ground wheel movement such that the tine rotation tends to assist in forward propulsion of the machine during tilling. If the tiller ground wheels are driven in a reverse direction while the tines are operating, however, the ground wheels must overcome such forward pulling forces of the tines, making rearward movement difficult.

Some tilling machines have tines that are driven in a direction counter to that of the forward ground wheel movement such that the tines cut upwardly through the untilled soil at the working face, creating rearwardly directed reactionary thrust forces to act on the machine during tilling. In this case, if the ground wheels are operated in a reverse direction as the tines are driven, the combined action of the ground wheels and rotating tines can cause sudden reverse tiller movement, again making it difficult for the operator to manually control the tiller, and in some instances, creating a danger to the operator.

Even transport of such tillers can be difficult if the tines are operating. If forwardly driven tines inadvertently strike the hard ground or pavement, they tend to walk over the surface causing rapid acceleration of the machine. If counter rotating tines strike the ground over which the machine is being transported, forward machine movement is haphazardly impeded.

While walk behind type garden tillers heretofore have been available with drive controls or transmissions which permit selective disengagement of power to the tines, such drive controls commonly have been relatively complicated or have required separate levers or the like for controlling the tine drive and the ground wheel drive. Complicated drives and controls tend to be unreliable for prolonged use in the rugged, severely vibratory conditions in which tillers operate. A multiplicity of control levers, on the other hand, is cumbersome for the operator to manipulate while at the same time attempting to manually hold on to the operating tiller.

It is an object of the present invention to provide a manually operated, walk behind, type soil tilling machine with relatively simple and easily controlled tine and ground wheel drives.

Another object is to provide a soil tilling machine as characterized above which includes a tine and ground wheel drive for tilling, a reverse ground wheel drive, and a tiller transport drive, all controlled by a single, simple lever that automatically disengages the tines when the tiller is operated in the reverse or transport driving modes.

A further object is to provide a tilling machine with tine and ground wheel drives of the above kind that has relatively few parts that must be shifted from operative to inoperative positions during a change in driving modes, and thus, is economical to produce and is reliable in operation.

Other objects and advantages of the invention will become apparent upon reading the following detailed description and upon reference to the drawings, in which:

FIG. 1 is a perspective of an illustrative soil tilling machine embodying the present invention;

FIG. 2 is an enlarged fragmentary section of the tine and ground wheel drive transmission of the illustrative machine;

FIG. 3 is an enlarged plan view of the transmission shift lever indicator of the illustrative machine, taken in the plane of line 3—3 in FIG. 2.

Figure 4:
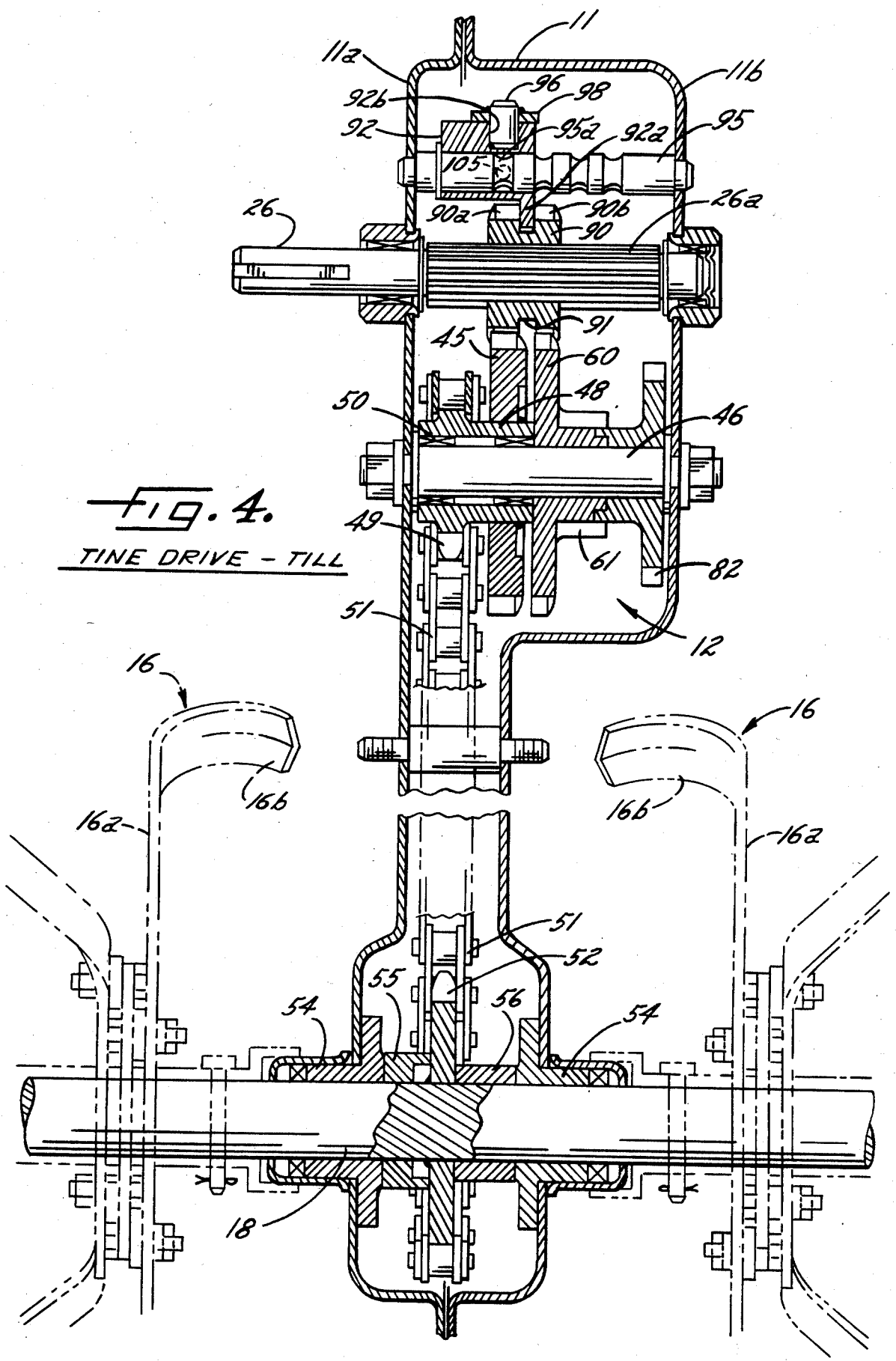
FIG. 4 is an enlarged section of the transmission when set in the tilling drive mode, taken in the plane of line 4—4—4—4 in FIG. 2.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the invention is to cover all modifications, alternative constructions and equivalents falling within the spirit and scope of the invention.

Referring now more particularly to the drawings, there is shown an illustrative soil tilling machine 10 embodying the present invention. The tilling machine 10 includes an elongated transmission case 11 which serves as the primary structural frame of the machine, as well as housing a power transmission 12 for the machine. The transmission case 11 is supported by a pair of ground wheels 14 mounted on an axial 15 rotatably carried in the transmission case. A single row of ground penetrating and pulverizing tines 16 are mounted on a tine axial or shaft 18 rotatably carried in the transmission case 11 rearwardly of the ground wheels and transversely to the line of machine movement. An internal combustion engine 20 is mounted on a forwardmost end of the transmission case 11 for driving the ground wheels 14 and tines 16, and an adjustably positionable handle 21 extends rearwardly of the transmission case 11 for enabling a user to operate the machine while walking from behind. The illustrated tines 16 are of the hoeing type, each having a base portion 16a that is curved in a retreating or opposite direction to that in which the tine is rotated and a tip portion 16b bent laterally to the base portion at the distal end thereof. The tines 16 in this case are driven in a direction counter to that of forward ground wheel movement, as will become apparent, such that they penetrate and cut upwardly through the untilled soil at the working face (FIG. 2). A tine shield 22 is mounted rearwardly of the transmission case for 11 enclosing the upper portions of the rotating tines 16.

The engine 20, which typically may be a 4-cycle gasoline powered internal combustion engine of between about 5 and 8 horsepower, has an output shaft 25 connected to a transmission input shaft 26 by respective sheaves 28, 29 and a drive belt 30. To permit selective operative coupling of the engine output shaft 25 to the transmission input shaft 26, a clutch 31 is provided (FIG. 2). The clutch 31 includes a bell crank 32 that is pivotably mounted on the transmission case 11 and carries an idler pulley 34 at the end thereof for engagement with the drive belt 30. The bell crank 32 is biased by a spring 35 toward a clutch disengaging position in which the idler pulley 34 is disengaged from the belt 30. A clutch cable 36 extends from an opposite end of the bell crank 32 to a clutch lever 38 (FIG. 1) pivotally connected to the underside of the end of the handle 21 for easy access by the operator. By moving the clutch lever 38 in a direction toward the underside of the handle 21, the clutch cable 36 will pivot the bell crank 32 against the biasing force of the spring 35, causing the idler pulley 34 to be moved to a position tightening the drive belt 30 sufficiently to drive the transmission input shaft 26. Upon release of the clutch lever 38, whether intentionally or in the event that an operator should stumble or otherwise lose control of the machine, the bell crank 32 will pivot, under the biasing force of the spring 35, to a position disengaging the idler pulley 34 from tightening relationship with belt 30, thereby interrupting the drive to the transmission input shaft 26. Hence, for operating the machine 10 in any of the drive modes hereinafter discussed, the clutch 31 is maintained in engaged condition, which the operator can easily effect by simply holding the lever 38 against the underside of the handle 21.

In accordance with the invention, the machine transmission includes a tilling drive mode, a reverse ground wheel drive mode, and a machine transport drive mode, all controlled by a single, simple lever that automatically disengages power transmission to the tines when the tiller is operated in the reverse or transport drive modes. The illustrated transmission 12 is contained within the transmission case 11, which comprises a two-part sealed housing 11a, 11b secured together by bolts 40. The housing parts 11a, 11b include flange extensions about their outer periphery which serve as structural frame members of the machine. The transmission 12 in this case includes three drive trains, one or more of which may be selectively coupled in driving engagement with the transmission input shaft 26 for the desired machine operation.

For rotatably driving the tines 16, the transmission 12 includes a first drive train (shown in FIGS. 2 and 4) which includes a tine drive gear 45 mounted for relative rotational movement on a primary gear shaft 46. The tine drive gear 45 is welded to one end of a hub 48, the opposite end of which is formed with a tine drive sprocket 49. The tine drive gear 45 and sprocket 49 are thereby adapted for rotation in unison on the primary shaft 46, and to facilitate such relative movement, bushings 50 are interposed between the hub 48 and shaft 46. A chain 51 connects the tine drive sprocket 49 to a sprocket 52 fixed to the tine shaft 18, which is rotatably supported in a lower rear portion of the transmission case 11 by bearings 54 and spacers 55, 56.

For rotatably driving the ground wheels in a direction for forward machine movement, the transmission 12 includes a second selectively engageable drive train (shown in FIGS. 2 and 5) which includes a ground wheel drive gear 60 mounted for rotational movement on the primary shaft 46 of the tine drive gear 45. The ground wheel drive gear 60 is operatively connected to the ground wheel axle 15 through a pinion 61 integrally formed on a hub extension of the drive gear 60, an intermediate gear 62 mounted on shaft 64 for engagement with the drive gear pinion 61 and having an integrally formed pinion 65, which in turn engages an intermediate gear 66 mounted on a shaft 68 and having an integral pinion 69 engaging a gear 70 fixed to the ground wheel axle 15. The ground wheel axle 15 is supported for rotational movement in the transmission case 11 by bearings 71 and spacers 72, 74,.

For driving the ground wheels 14 in a direction for reverse machine movement, the transmission 12 includes still a third drive train (shown in FIG. 2 and partially in FIGS. 5 and 6) which includes a reverse idler gear 80 mounted on an idler shaft 81 and engageable with a reverse drive gear 82 mounted on the primary gear shaft 46 in fixed axially spaced relation to the ground wheel drive gear 60 for rotation in unison with the drive gear 60. The drive gear 60 is operatively connected to the ground wheel axle 15 through the gears 62, 66, and 70 as previously described.

In keeping with the invention, means actuated from a single push-pull lever is provided for coupling one or more selected of the drive trains to the transmission input shaft for operating the machine in either a tilling drive mode plus a forward driving mode, a machine transport drive mode, a neutral mode, or a reverse drive mode. In the illustrated embodiment, the transmission input shaft 26 has a splined portion 26a within the transmission case 11 which carries a broad faced input pinion 90 for rotation with the input shaft 26 and for selected axial movement relative to the shaft. The pinion 90 in this instance is formed with axially spaced first and second gear sections 90a, 90b which are separated by a circumferential slot 91 about the periphery of the pinion. For axially moving the pinion 90 over the splined input shaft 26, a yoke 92 having a depending flange 92a extending into the pinion slot 91 is mounted for shifting axial movement on a yoke shaft 95.

To move the yoke 92 relative to the yoke shaft 95, and thereby shift the pinion 90 relative to the input shaft 26, the upper side of the yoke is formed with a slot 92b that is disposed transversely to the axis of the yoke shaft 95 and receives a pin 96 fixed to the outermost end of a pivot plate 98. The pivot plate 98 in turn is fixed at its opposite end to the bottom of a pivot shaft 99 carried in a cylindrical support 100 extending through the transmission case 11 (FIG. 2). The top end of the shaft 99 is fixed to one end of a lever link 101; the other end of the lever link 101 is pivotally connected to the end of a push-pull rod 102 that extends from the lever link 101 along the length of the handle 21 and terminates in an upwardly turned gripping head 102a for easy access by the machine operator. By simple push-pull movement of the rod 102, the link 101, pin 99, and plate 98 can be rotated to move the yoke 92 axially along the shaft 95. During such movement of the pivot plate 98, the pin 96 thereof rides in the yoke slot 92b to accommodate for slight relative arcing movement of the pin relative to the yoke.

In operation of the machine 10, it will be seen that by simple push-pull movement of the transmission shift rod 102, the yoke 92 may be moved to shift the input pinion 90 along the splined input shaft 26a to the desired drive mode location, including the tilling drive mode position (FIG. 4), the transport drive mode position (FIG. 5), the reverse drive mode position (FIG. 6), or a neutral drive mode position between the transport and reverse drive mode positions. With the yoke 92 positioned at the tilling drive mode position as shown in FIG. 4, the first and second gear sections 90a, 90b of the input pinion 90 respectively engage the tine drive gear 45 and the ground wheel drive gear 60. Rotation of the tine drive gear 45 will thereby drive the tines through the first drive train sprocket 49, chain 51 and sprocket 52. At the same time, the ground wheels are driven in a direction for forward machine movement through the second drive train gears 60, 62, 66 and 70. In the illustrated embodiment, it can be seen that during tilling operation of the machine, the tines 16 are driven in a direction counter to the forward drive wheel movement such that the tines penetrate and cut upwardly through the untilled soil at the working face as the machine moves forwardly under power of the ground wheels. It will be appreciated that alternatively the tine drive train could be designed, and the appropriate tines utilized, for tilling with the tines rotating in the same direction as the forward ground wheel movement.

Figure 5:
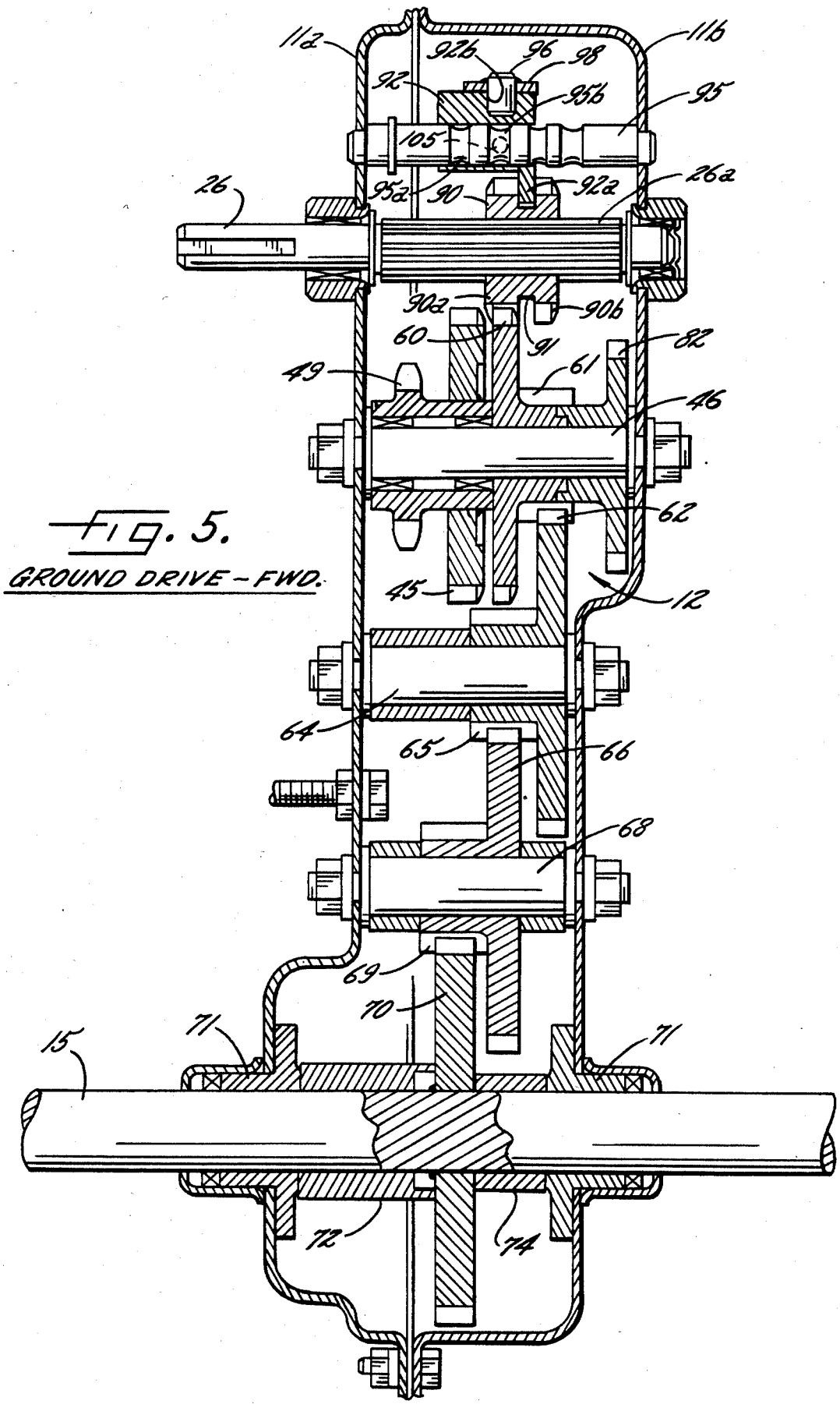
FIG. 5 is an enlarged section of the transmission when set in the tiller transport drive mode, taken in the plane of line 5—5—5—5—5 in FIG. 2.

By moving the transmission shift rod 102 to locate the shift yoke 92 and input pinion 90 in the transport drive mode position, shown in FIG. 5, the first gear section 90a of the input pinion 90 is moved into engagement with the ground wheel drive gear 60, while the second gear section 90b is moved out of engagement with any of the drive trains. In such position, power is transmitted to the ground wheels through the input pinion shaft 26, first gear section 90a of the input pinion 90, and the gears 60, 62, 66 and 70 for again rotating the ground wheels in a direction for forward machine movement. Since the tine drive gear 45 is not engaged with the input pinion 90 in this instance, shifting from the tilling drive mode to the transport drive mode automatically interrupts power transmission to the tines so that they are idle as the machine is transported to and from tilling sites.

Figure 6:
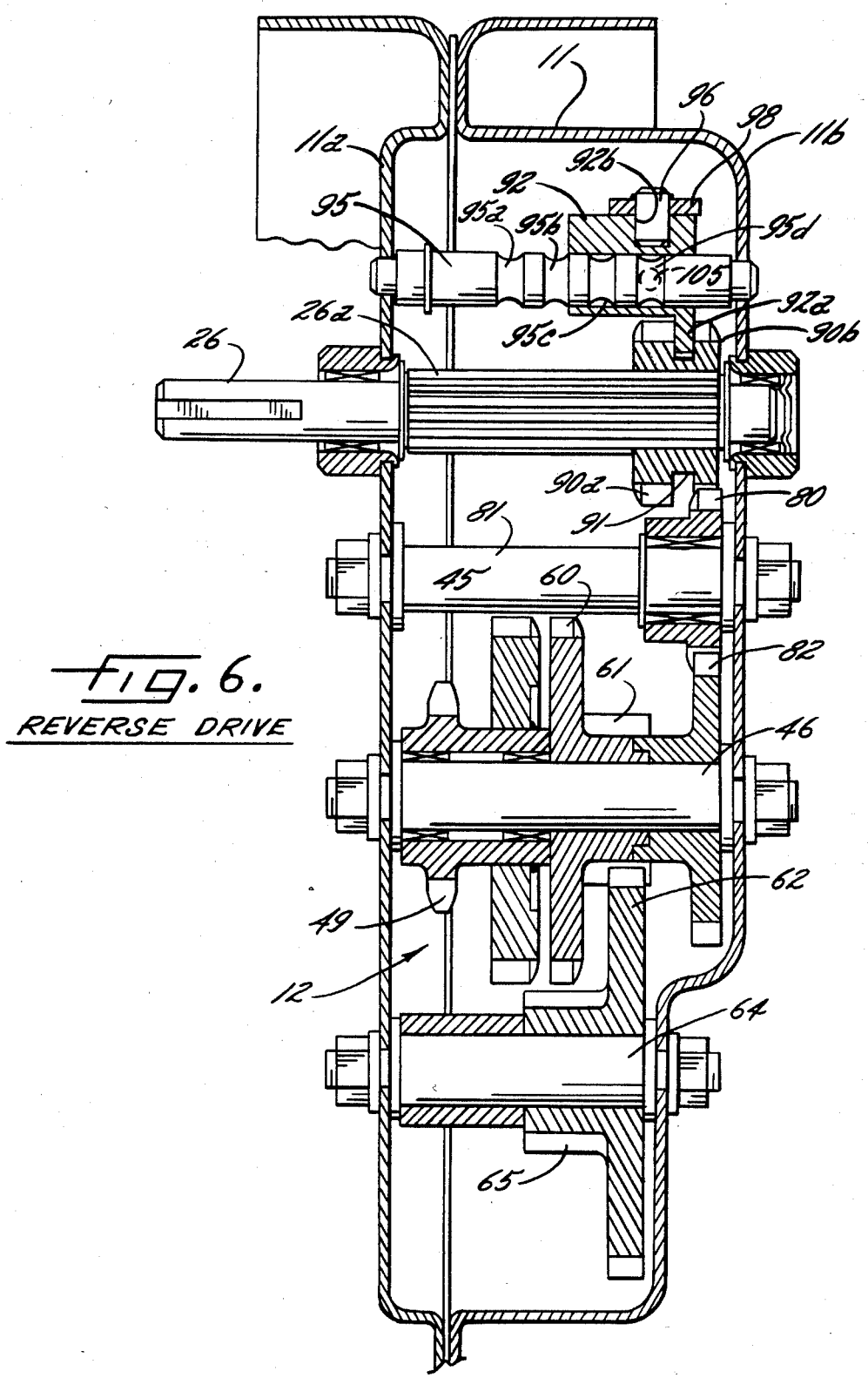
FIG. 6 is an enlarged section of the transmission when set in the reverse drive mode, taken in the plane of line 6—6—6—6—6 in FIG. 2.

Upon shifting the rod 102 to locate the shift yoke 92 and input pinion 90 in the reverse drive mode position, shown in FIG. 6, the second gear section 90b of the input pinion 90 engages the reverse idler gear 80, which in turn drives the reverse gear 82, drive gear 60, and gears 62, 66, and 70. By virtue of driving gears 60, 62, 66, and 70 through the reverse idler gear 80, it will be seen that the ground wheels rotate in a direction opposite to that when coupled to the input pinion 90 directly through the drive gear 60. In the reverse drive mode position shown in FIG. 6, the first gear section 90a of the input pinion 90 again is not engaged with any of the drive trains. Hence, upon shifting from the tilling drive mode position to the reverse drive mode position, power transmission to the tines again automatically is terminated.

To permit setting of the transmission to an idler drive mode position, the ground wheel drive gear 60 is axially separated from the reverse idler gear 80 and reverse drive gear 82 by a distance greater than the width of the broad faced input pinion 90 such that the input pinion 90 may be located between such gears without engaging either the tine, ground wheel, or reverse drive trains. Hence, even with the transmission input shaft powered, the machine will stand idle.

In order to facilitate relatively precise axial positioning of the yoke 92 on the shaft 95, and thus the proper positioning of the input pinion 90, the yoke shaft 95 is formed with a series of circumferential grooves 95a-d at predetermined axially spaced locations corresponding to the yoke position for the respective tilling, transport, nuetral and reverse drive modes. The yoke 92 carries a spring biased ball detent 105 (FIG. 2) adapted to snap into position as the yoke reaches the desired location. The lever link 101 further includes a pointer arm 101a for indicating the transmission setting on an indicator plate 106 (FIG. 3).

From the foregoing, it can be seen that the tilling machine of the present invention has a transmission that is simple and easily controlled, but yet highly versatile. The transmission includes a tine and ground wheel drive for tilling, a reverse ground wheel drive, and a tiller transport drive, all controlled by a single, simple lever that automatically disengages the tines when the tiller is operated in either the reverse or transport drive modes. It will be appreciated by one skilled in the art that the transmission includes relatively few parts that must be shifted from operative to inoperative positions during a change in drive modes, and thus, the transmission is not only economical to produce, but lends itself to reliable operation under severe vibratory conditions that exist during tilling.

What is claimed is:

1. In combination with a soil tilling machine comprising, a frame; a pair of ground wheels supporting the frame for movement on the ground; a plurality of tines supported by the frame and engageable with the ground for tilling; an engine mounted on the frame for powering said tines and ground wheels; means extending rearwardly from said frame such that movement of the machine may be guided by an operator walking with and behind the machine; a transmission coupled between said engine and said tines and ground wheels; said transmission including an input shaft; and means operatively connecting said input shaft to said engine, the improvement which comprises:

(a) said transmission having three drive trains;

(b) the first drive train being operatively coupled to said tines and selectively coupleable to said input shaft whereby rotation of the input shaft causes rotation of the tines when said first drive train is operatively coupled to said input shaft;

(c) the second drive train being operatively coupled with said ground wheels and selectively coupleable to said input shaft whereby rotation of the input shaft causes rotation of the ground wheels in a direction for forward machine movement when said second drive train is operatively coupled with said input shaft;

(d) the third drive train being operatively coupled to said ground wheels and selectively coupleable to said input shaft whereby rotation of the input shaft causes rotation of the ground wheels in a direction for reverse machine movement when said third drive train is operatively coupled to said input shaft; and (e) control means for connecting selected of said drive trains to said input shaft for the desired machine operation, said control means being actuated from a single lever for selectively setting said transmission to one of three drive modes for the desired operation of said machine;

(f) the first drive mode being a tilling drive mode whereby said ground wheels are driven in a direction for forward machine movement and said tines are rotatably driven;

(g) the second drive mode being a reverse drive mode whereby said ground wheels are driven in a direction for reverse machine movement and said tines are idle;

(h) the third drive mode being a transport drive mode whereby said ground wheels are driven in a direction for forward machine movement and said tines are idle.

2. The improvement of claim 1 in which said transmission includes a neutral drive mode whereby said ground wheels and tines are both idle during operation of said engine.

3. The improvement of claim 1 in which said first, second and third drive trains each include a respective lead drive gear, means mounting said lead drive gears in axially spaced relation to each other, and said control means includes an axially shiftable input pinion for operatively connecting 1 the selected lead drive gear to said input shaft for desired machine operation.

4. The improvement of claim 3 in which said lead drive gears for said first and third drive trains are disposed in axially spaced relation on opposite sides of the lead gear for said second drive train, and said input pinion is selectively shiftable (1) to simultaneously couple the lead drive gears of said first and second drive trains to said input shaft to effect said tilling drive mode of operation, (2) to singularly couple the lead drive gear of said second drive train to said input shaft to effect said transport drive mode of operation, and (3) to singularly couple the lead drive gear of said third drive train to said input shaft to effect said reverse drive mode of operation.

5. The improvement of claim 4 in which said input pinion includes first and second gear sections, said input pinion being positionable such that said first and second gear sections respectively engage the lead gears of said first and second drive trains during said tilling drive mode operation, said first gear section engages said second drive train lead gear during said transport drive mode of operation, and said second gear section engages said third drive train lead gear during said reverse drive mode of operation.

6. The improvement of claim 4 in which said lead drive gears are mounted in axially spaced relation on a common shaft, and said input pinion is operative for selectively coupling the lead drive gear of said third drive train to said input shaft through a separately mounted reverse idler gear for driving said ground wheels in a direction for reverse machine movement.

7. The improvement of claim 4 in which the lead drive gears for said first and second drive trains are mounted on said common shaft for relative rotational movement with respect to each other.

8. The improvement of claim 7 in which said lead drive gear for said third drive train is mounted on said common shaft for rotational movement in unison with the lead gear for said second drive train.

9. The improvement of claim 3 in which said input pinion is axially shiftable to a position out of operative engagement with any of said drive trains for operating the machine in an idle drive mode.

10. The improvement of claim 3 in which said control means includes a yoke, means for mounting said yoke within said transmission for parallel movement with respect to said input shaft, means coupling said yoke to said input pinion, a push-pull rod, and means coupling said yoke to said rod whereby push-pull movement of said rod permits axial positioning of said yoke and input pinion into operative relation with said drive train lead gears.

11. The improvement of claim 10 in which said yoke mounting means includes a mounting shaft formed with a plurality of grooves in predetermined axially spaced locations corresponding to the yoke position for the respective tilling, transport, and reverse drive modes, and said yoke includes detent means for snapping into one of said shaft grooves as the yoke reaches the desired position.

12. The improvement of claim 1 in which said first drive train is operative to rotatably drive said tines in a direction counter to the forward ground wheel movement.

13. The improvement of claim 1 in which said frame is a transmission casing that houses said first, second and third drive trains.

14. The improvement of claim 1 including clutch means for selectively operatively connecting the transmission input shaft to said engine for rotatably driving the input shaft.

15. In combination with a soil tilling machine comprising, a frame; a pair of ground wheels supporting the frame for movement on the ground; a rotatable tool supported by the frame; an engine mounted on the frame for powering said tool and ground wheels; means extending rearwardly from said frame such that movement of the machine may be guided by an operator walking with and behind the machine; a transmission coupled between said engine and said tool and ground wheels; said transmission including an input shaft; and means operatively connecting said input shaft to said engine; the improvement which comprises:

(a) said transmission having three drive trains;

(b) the first drive train being operatively coupled to said tool and selectively coupleable to said input shaft whereby rotation of the input shaft causes rotation of the tool when said first drive train operatively coupled to said input shaft;

(c) the second drive train being operatively coupled with said ground wheels and selectively coupleable to said input shaft whereby rotation of the input shaft causes rotation of the ground wheels in a direction for forward machine movement when said second drive train is operatively coupled with said input shaft;

(d) the third drive train being operatively coupled to said ground wheels and selectively coupleable to said input shaft whereby rotation of the input shaft causes rotation of the ground wheels in a direction for reverse machine movement when said third drive train is operatively coupled to said input shaft;

(e) control means for connecting selected of said drive trains to said input shaft for the desired machine operation, said control means being actuated from a single push-pull rod for selectively setting the transmission to one of three drive modes for the desired operation of said machine;

(f) the first drive mode being a tool drive mode whereby said ground wheels and tool are simultaneously power driven;

(g) the second drive mode being a forward transport drive mode wherein the ground wheels are driven forwardly while the tool is not driven;

(h) the third drive mode being a reverse ground wheel drive mode wherein the ground wheels are driven in a reverse direction while the tool is not driven; and said control means being operable to automatically disengage power transmission to the tool when the transmission is shifted from the tool drive mode to one of said forward transport and reverse ground wheel drive modes.

16. The improvement of claim 15 in which said transmission includes a neutral drive mode whereby said ground wheels and tools are both idle during operation of said engine.

17. The improvement of claim 15 in which said first, second and third drive trains each include a respective lead drive gear, means mounting said lead drive gears in axially spaced relation to each other, and said control means includes an axially shiftable input pinion for operatively connecting the selected lead drive gears to said input shaft for desired machine operation.

* * * * *